US012014871B2

(12) United States Patent
Shah

(10) Patent No.: US 12,014,871 B2
(45) Date of Patent: Jun. 18, 2024

(54) SINGLE SOLENOID BASED DOUBLE ACTUATOR DEVICE

(71) Applicant: Rotex Automation Limited, Vadodara (IN)

(72) Inventor: Nirav Shah, Vadodara (IN)

(73) Assignee: Rotex Automation Limited, Vadodara (IN)

( * ) Notice: Subject to any disclaimer, the term of this patent is extended or adjusted under 35 U.S.C. 154(b) by 174 days.

(21) Appl. No.: 17/754,944

(22) PCT Filed: Jun. 1, 2020

(86) PCT No.: PCT/IB2020/055159
§ 371 (c)(1),
(2) Date: Apr. 16, 2022

(87) PCT Pub. No.: WO2021/074703
PCT Pub. Date: Apr. 22, 2021

(65) Prior Publication Data

US 2022/0367097 A1 Nov. 17, 2022

(30) Foreign Application Priority Data

Oct. 18, 2019 (IN) ............................ 201921042383

(51) Int. Cl.
*H01F 7/16* (2006.01)
*H01F 7/08* (2006.01)

(52) U.S. Cl.
CPC ........... *H01F 7/1615* (2013.01); *H01F 7/081* (2013.01); *H01F 2007/086* (2013.01)

(58) Field of Classification Search
CPC .. H01F 7/1615; H01F 7/081; H01F 2007/086; H01F 7/1607; H01F 7/1638
USPC .......................................................... 335/220
See application file for complete search history.

(56) References Cited

U.S. PATENT DOCUMENTS

| | | | | |
|---|---|---|---|---|
| 6,040,752 A * | 3/2000 | Fisher | H01F 7/1615 335/229 |
| 2005/0024174 A1* | 2/2005 | Kolb | H01F 7/1615 335/220 |
| 2007/0257757 A1* | 11/2007 | Kolb | H01F 7/1615 335/229 |
| 2013/0222089 A1* | 8/2013 | Daitoku | H01H 51/20 335/259 |

(Continued)

*Primary Examiner* — Shawki S Ismail
*Assistant Examiner* — Lisa N Homza
(74) *Attorney, Agent, or Firm* — AVEK IP, LLC

(57) ABSTRACT

A single solenoid based double actuator device 100 is disclosed having a first actuator 106 configured for linear movement between actuated and dropped positions along an axis of a winding 102 and biased towards dropped position, and a second actuator 120 arranged spaced apart from the first actuator 106 for linear movement between actuated and dropped positions and biased towards dropped position. A pair of magnetic paths, an upper magnetic path 130, and a lower magnetic path 132, is provided at two ends of the actuators such that first actuator, upper plate 130, second actuator 120 and lower plate 132 provide a magnetic path for a magnetic field generated on passing a current through the winding 102. On passing a current exceeding a first current value, through the winding, one of the actuators is actuated, and on the current exceeding a second current value, other actuator is also actuated.

18 Claims, 5 Drawing Sheets

(56) References Cited

U.S. PATENT DOCUMENTS

2016/0104562 A1* 4/2016 Doljack .................. H01F 7/081
29/606

* cited by examiner

SINGLE SOLENOID BASED DOUBLE ACTUATOR DEVICE

TECHNICAL FIELD

The present disclosure relates generally to the field of solenoid actuators. In particular, the present disclosure pertains to an actuating device having two contacts actuated by a single solenoid.

BACKGROUND

Background description includes information that may be useful in understanding the present invention. It is not an admission that any of the information provided herein is prior art or relevant to the presently claimed invention, or that any publication specifically or implicitly referenced is prior art.

It is common to use solenoids for actuating a switch. A solenoid device includes an electromagnetic coil, which generates magnetic flux when a current is passed through the coil. The generated magnetic flux is used to attract a plunger towards a fixed core of the electromagnetic coil. A spring member is disposed between the plunger and the fixed core. When passage of current to the electromagnetic coil is stopped, the magnetic force decreases, and the plunger is moved away from the fixed core by the biasing force of the spring member. Thus, by passing the current through the electromagnetic coil, or discontinuing the current, the plungers can be moved linearly in forward/backward direction. The linear forward/backward movement of the plunger is used to actuate different devices, such as switches for turning them on/off, solenoid valves or relays etc.

Many applications require actuation of more than one device, such as solenoid valves, and it becomes imperative to have as many solenoids as the number of devices, which makes the equipment bulky on account of more space required to accommodate more solenoids, as well as increases cost of the equipment. To overcome the above problem, solenoid devices having a single coil that actuates more than one valve actuator have been proposed.

For example, German Patent document DE10248143 discloses an electromagnetic actuator having a sleeve-shaped or tubular yoke, in which permanent magnets and a coil are arranged adjacent to one another in an annular arrangement along a longitudinal axis of the yoke. The coil and the permanent magnets are arranged in a bobbin of tubular shape, and has a through hole extending along the longitudinal axis. Two armatures are guided within the through hole of the bobbin for linear movement along the longitudinal axis. The permanent magnets set up a magnetic field, which draws the two armatures together against a force of return springs that act to push the armatures away from each other. The coil may set up a field in the other direction such that the force due to the permanent magnets is overcome to push the armatures apart. The armatures have fastening rods on their outer ends to transfer force due to the coil to the devices to be actuated.

The cited patent reference discloses a single coil based double actuator device where the actuators are arranged in collinear fashion. However, in certain applications, it may not be possible to arrange the two actuators in collinear manner.

United States Patent application number 20130222089A1 discloses solenoid device having a first electromagnetic coil; first and second plungers movable on energization of the first electromagnetic coil; first and second fixed cores respectively facing the first and second plungers; and a yoke. When the first electromagnetic coil is not energized, first and second gaps are formed between the first and second plungers and the respective first and second fixed cores. When the first electromagnetic coil is energized, the magnetic flux flows in a first magnetic circuit, provided by the first plunger, the first fixed core and the yoke, via the first gap, and a second magnetic circuit, provided by the first and second plungers, the first and second fixed cores and the yoke, via the first and second gaps, so that the first and second plungers are attracted toward the first and second fixed cores. However, since the first magnetic circuit passes through only the first gap, and the second magnetic circuit passes through both of the first and second gaps, larger amount of the magnetic flux flows in the first magnetic circuit which results in stronger magnetic force on the first plunger to actuate the first plunger before the second plunger. The cited patent reference discloses a complex structure to configure two magnetic circuits such that strength of the magnetic flux in the respective circuits depends on number of gaps in the respective circuits.

It would therefore be advantageous to provide an improved single solenoid double actuator device that does not require the two actuators to be in collinear arrangement and is simple in construction.

OBJECTS OF THE INVENTION

A general object of the present disclosure is to provide a single solenoid double actuator device that overcomes drawback of known devices.

An object of the present disclosure is to provide a single solenoid double actuator device that does not require the two actuators to be in collinear arrangement.

Another object of the present disclosure is to provide a single solenoid double actuator device that allows actuation of the two actuators in sequential manner.

Yet another object of the present disclosure is to provide a single solenoid double actuator device that uses a single magnetic path to actuate the two actuators.

Still another object of the present disclosure is to provide a single solenoid double actuator device that consumes less power by enabling actuation of the two actuators by current pulses.

SUMMARY

Aspects of the present disclosure relate to a solenoid actuation device. In an aspect, the proposed solenoid actuation device incorporates a single solenoid coil (also referred to as solenoid winding, or simply as winding, or as coil, and all the terms used interchangeably hereinafter) but two actuator plungers that are actuated at two different current values passed through the coil. In another aspect, the two actuator plungers of the disclosed device are arranged generally in parallel configuration spaced apart from each other, thereby overcoming limitation of the known devices that require the two actuator plungers to be arranged in collinear fashion, which may not be possible in certain applications.

In one embodiment, the proposed single solenoid based double actuator device includes a solenoid winding having an opening along an axis of the solenoid winding and a first actuator plunger configured through the opening for linear movement along the axis of the solenoid winding between an actuated position and an unactuated position, referred to in the art as dropped position and the two terms used interchangeably hereinafter. The first actuator plunger is biased by a first biasing force to remain in the dropped position.

The device further includes a pair of magnetic paths having an upper magnetic path located at an upper end of the solenoid winding, and a lower magnetic path located at a lower end of the solenoid winding.

A second actuator plunger is arranged for linear movement between an actuated position and an dropped position along a second actuator axis, and is biased by a second biasing force to remain in the dropped position. The second actuator is arranged between the upper magnetic path and the lower magnetic path such that the second actuator axis is spaced apart from the axis of the solenoid winding.

In an aspect, the first actuator plunger, the upper magnetic path, the second actuator plunger and the lower magnetic path provide a magnetic path for a magnetic field created as a result of passing of a current through the solenoid winding; and in another aspect, the first biasing force, the second biasing force and the magnetic path is configured such that when the current through the solenoid winding exceeds a first current value, one of the first actuator plunger and the second actuator plunger is moved to the corresponding actuated position overcoming the corresponding biasing force, and when the current through the solenoid winding exceeds a second current value, which is higher than the first current value, other of the first actuator plunger and the second actuator plunger is also moved to the corresponding actuated position overcoming the corresponding biasing force.

The first biasing force may be higher than the second biasing force, and when the current through the solenoid winding exceeds the first current value, the first actuator plunger may move to its actuated position overcoming the first biasing force. When the current through the solenoid winding exceeds the second current value, the second actuator plunger may move to the corresponding actuated position overcoming the second biasing force.

The first biasing force may be provided by a first spring configured between a collar on the first actuator plunger and the first guide to bias the first actuator plunger in a direction towards the lower magnetic path.

The second biasing force may be provided by a second spring configured between the second actuator plunger and the upper magnetic path to bias the second actuator plunger in the direction towards the lower magnetic path.

In an embodiment, actuation of the first actuator plunger at a lower current and actuation of the second actuator plunger at a higher current may be achieved by providing two magnetic paths such that the first actuator plunger is part of both the magnetic paths but the second actuator plunger is part of only one of the two magnetic paths. The first actuator plunger being part of two magnetic paths is subjected to higher magnetic force and therefore may get actuated at lower current through the coil, and the second actuator plunger being part of only one of the two magnetic paths, is subjected to lower magnetic force and therefore shall get actuated at higher current through the coil.

To achieve two magnetic paths, the upper magnetic path and the lower magnetic path may be coupled to each other by a connecting portion located between the second actuator plunger and the solenoid winding. The connecting portion may provide a secondary magnetic path through the first actuator plunger, a part of the upper magnetic path, the connecting portion and a part of the lower magnetic path.

When the current through the solenoid winding exceeds the first current value, only the first actuator plunger may move to the corresponding actuated position overcoming the corresponding biasing force on account of higher magnetic force from combination of magnetic fields through the magnetic path formed by the first actuator plunger, the upper magnetic path, the second actuator plunger and the lower magnetic path, and the secondary magnetic path formed by the first actuator plunger, a part of the upper magnetic path, the connecting portion and a part of the lower magnetic path.

When the current through the solenoid winding exceeds the second current value, the second actuator plunger may also move to the corresponding actuated position overcoming the corresponding biasing force on account of magnetic force from comparatively weaker magnetic field through the secondary magnetic path formed by the first actuator plunger, a part of the upper magnetic path, the connecting portion and a part of the lower magnetic path.

In another embodiment, a single solenoid based double actuator device is disclosed, wherein the axis of the solenoid is separated from axis of first actuator and the second actuator. The device includes a solenoid winding having an opening along an axis of the solenoid winding and a connecting static pole located along the axis of the solenoid winding through the opening, a pair of magnetic paths having an upper magnetic path located at an upper end of the connecting static pole, and a lower magnetic path located at a lower end of the connecting static pole. A first actuator plunger is arranged for linear movement between an actuated position and an dropped position along a first actuator axis between the upper magnetic path and the lower magnetic path, and a second actuator plunger is arranged for linear movement between an actuated position and an dropped position along a second actuator axis between the upper magnetic path and the lower magnetic path. The first actuator plunger is biased by a first biasing force to remain in the dropped position, and the second actuator plunger is biased by a second biasing force to remain in corresponding dropped position.

The first actuator plunger and the second actuator are arranged between the upper magnetic path and the lower magnetic path such that the first actuator axis and the second actuator axis are spaced apart from the axis of the solenoid winding.

In an aspect, the connecting static pole, the upper magnetic path, the first actuator plunger, the static pole and the lower magnetic path provide a first magnetic path for a magnetic field created as a result of passing of a current through the solenoid winding, and the connecting static pole, the upper magnetic path, the second actuator plunger, and the lower magnetic path provide a second magnetic path for the magnetic field created as a result of passing of a current through the solenoid winding.

In an aspect, the first biasing force, the second biasing force, the first magnetic path and the second magnetic path are configured such that when the current through the solenoid winding exceeds a first current value, one of the first actuator plunger and the second actuator plunger is moved to the corresponding actuated position overcoming the corresponding biasing force, and when the current through the solenoid winding exceeds a second current value, which is higher than the first current value, other of the first actuator plunger and the second actuator plunger is also moved to the corresponding actuated position overcoming the corresponding biasing force.

The solenoid axis may be located between the first actuator axis and the second actuator axis.

In yet another embodiment of the disclosure, a single solenoid based double actuator device is disclosed, wherein the first biasing force is provided by a combination of a first permanent magnet and a first spring configured with the first actuator plunger, and the second biasing force is provided by a combination of a second permanent magnet and a second spring configured with the second actuator plunger.

The magnetic field generated as a result of passing of a current through the solenoid winding, either supports or nullifies magnetic fields of the first permanent magnet and the second permanent magnet, which changes the net biasing force on the corresponding actuator plunger such that when the current through the solenoid winding exceeds a first current value in one direction, one of the first actuator plunger and the second actuator plunger is moved to the corresponding actuated position. When the current through the solenoid winding exceeds a second current value, which is higher than the first current value, other of the first actuator plunger and the second actuator plunger is also moved to the corresponding actuated position overcoming even the second biasing force.

The first permanent magnet and the second permanent magnet may be configured such that the respective magnetic fields are in opposite directions, in which case the magnetic field generated as a result of passing of a current through the solenoid winding shall add to the magnetic field of the one of the two permanent magnets and shall nullify the magnetic field of the other of the two permanent magnets. When a current exceeding the first current value is applied through the solenoid winding in a first direction one of the first actuator plunger and the second actuator plunger shall move to the corresponding actuated position. On the other hand, when a current exceeding the second current value is applied through the solenoid winding in a second direction that is opposite the first direction, other of the first actuator plunger and the second actuator plunger shall be moved to the corresponding actuated position. When the current in the second direction is increased, both the actuator plungers are moved to the corresponding actuated position.

In yet another embodiment, a single solenoid based double actuator device is disclosed, wherein the first biasing force is provided by a combination of a first permanent magnet and a first spring configured with the first actuator plunger, and the second biasing force is provided by a combination of a second permanent magnet and a second spring configured with the second actuator plunger. The two permanent magnets and the corresponding springs are configured such that magnetic force on the first actuator plunger and the second actuator plunger from the respective permanent magnets partly nullifies the force from the corresponding springs The magnetic field generated as a result of passing of a current through the solenoid winding, either supports or nullifies magnetic fields of the first permanent magnet and the second permanent magnet to change the net biasing force on the corresponding actuator plunger such that when the current through the solenoid winding exceeds a first current value, one of the first actuator plunger and the second actuator plunger is moved to the corresponding actuated position, and when the current through the solenoid winding exceeds a second current value, other of the first actuator plunger and the second actuator plunger is also moved to the corresponding actuated position.

Each of the first actuator plunger and the second actuator plunger and the corresponding permanent magnets are configured for latching of the first actuator plunger and the second actuator plunger in the corresponding actuated positions such that after the current through the solenoid winding is stopped, the first actuator plunger and the second actuator plunger remain in the respective actuated positions, which enables actuation of the device by applying current pulses.

The first permanent magnet and the second permanent magnet may be configured such that the respective magnetic fields are in opposite directions, and the magnetic field generated as a result of passing of a current through the solenoid winding adds to the magnetic field of the one of the two permanent magnets and nullifies the magnetic field of the other of the two permanent magnets. When a current pulse exceeding the first current value is applied through the solenoid winding in a first direction, one of the two actuator plungers is moved to the corresponding actuated position, and when the current pulse exceeding the second current value is applied through the solenoid winding in the opposite direction, the other actuator plunger is also moved to the corresponding actuated position.

The second current value of the second pulse applied in the opposite direction may be lower than the first current value so that the first actuator plunger does not move to the dropped position.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
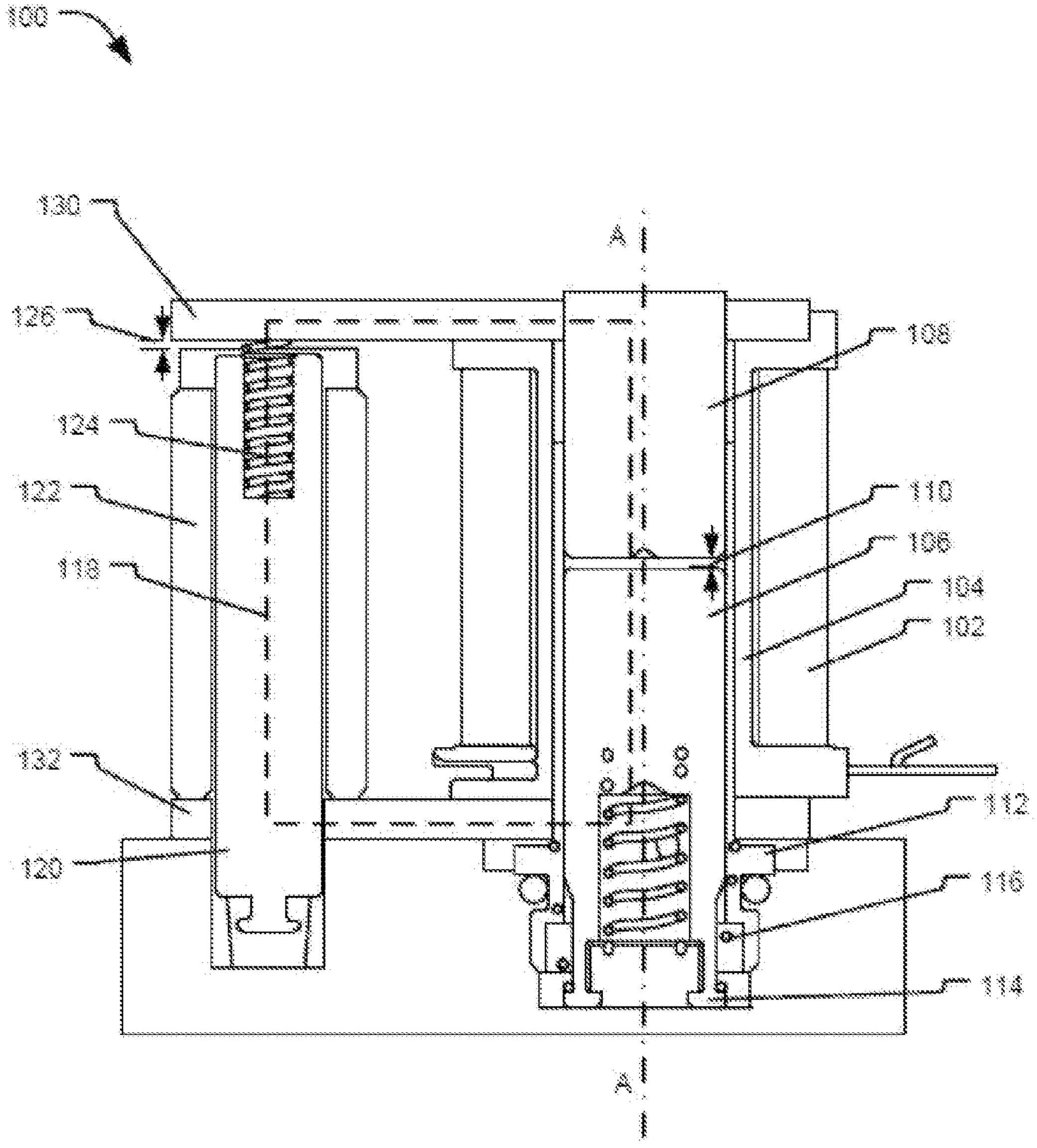
FIG. 1 illustrates an exemplary representation of the proposed single solenoid based double actuator device having a single magnetic path, in accordance with embodiments of the present disclosure.
Figure 2A:
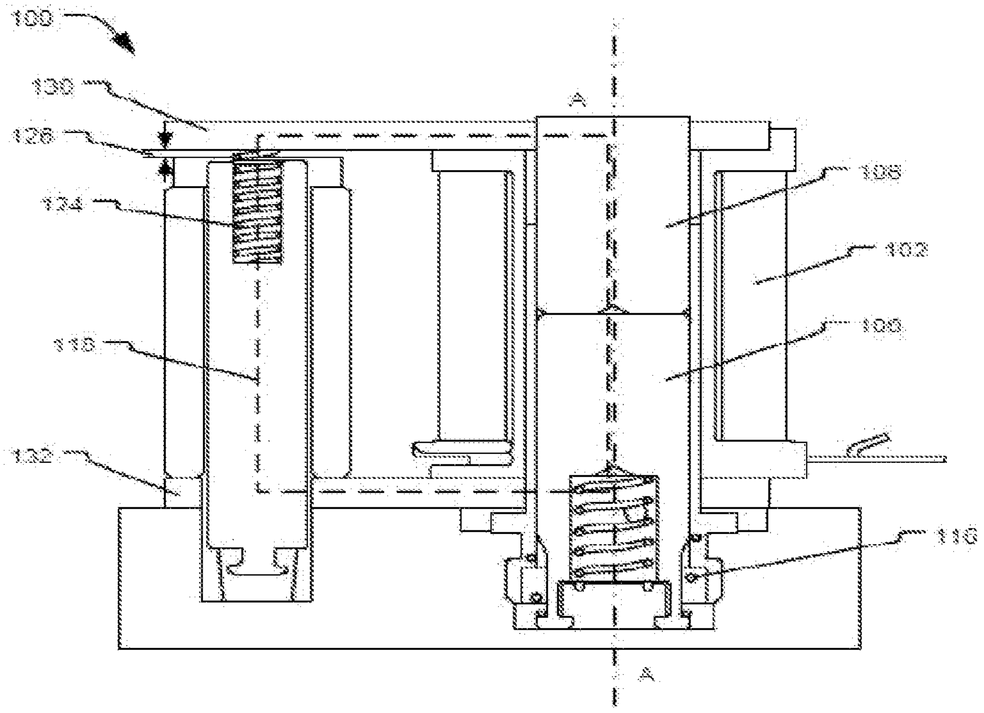
FIG. 2A illustrates an exemplary representation of the single solenoid based double actuator device of FIG. 1 showing a first actuator plunger in actuated position, in accordance with embodiments of the present disclosure.
Figure 2B:
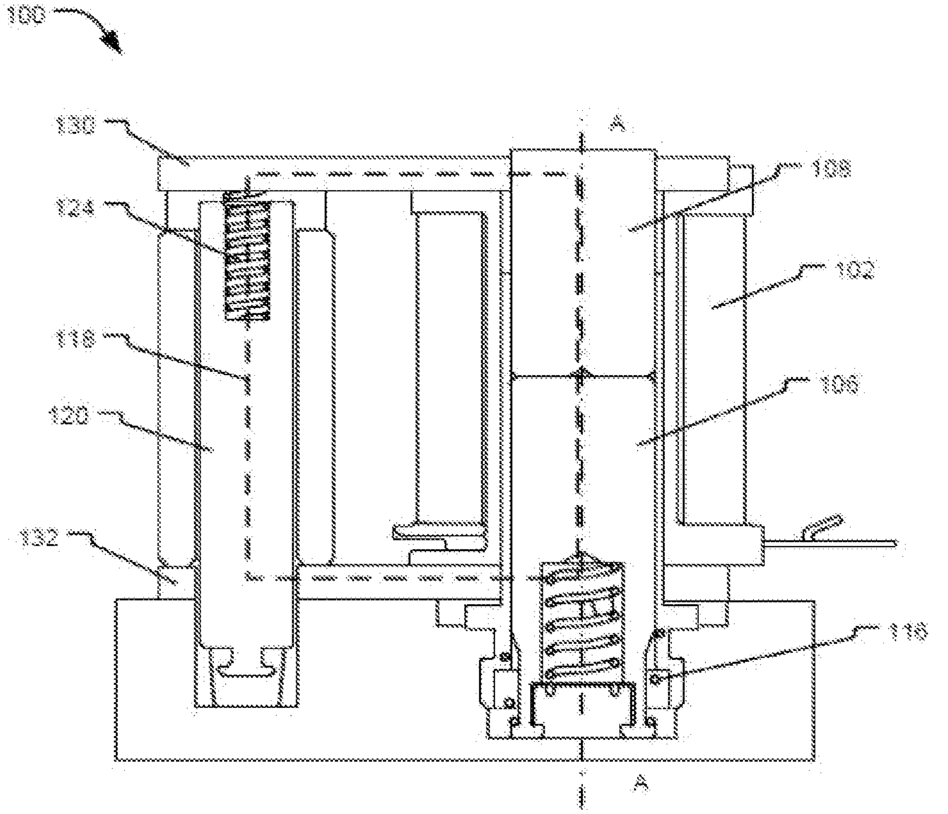
FIG. 2B illustrates an exemplary representation of the single solenoid based double actuator device of FIG. 1 showing both the actuator plungers in actuated position, in accordance with embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms are used herein. To the extent a term used in a claim is not defined, it should be given the broadest definition persons in the pertinent art have given that term as reflected in printed publications and issued patents at the time of filing.

The term "spring" used herein refers to an elastic object that on deformation stores mechanical energy, and includes, besides a metallic helical spring, rubber or plastic designs that behave like metallic helical springs to store energy and provide biasing force on being deformed.

Embodiments explained herein relate to a single solenoid double actuator device, which actuates two actuators at two different current values. In another aspect, the two actuator plungers of the disclosed device are arranged in parallel configuration spaced apart from each other, thereby overcoming limitation of the known devices that require the two actuator plungers to be arranged in collinear fashion, which may not be possible in certain applications.

It is to be appreciated that while various embodiments explained herein show the pull plunger mechanism where in energized condition actuators are actuated (pulled up) and dropped down with spring load, it would be evident to those skilled in that art that concepts of the present disclosure can be used to derive mechanisms where actuators is in push plunger mechanism where in energized condition actuators are pushed down and pushed up with spring load.

In one embodiment, the device is configured such that passing a current through the single coil creates a single magnetic path through the two actuator plungers, and the two actuator plungers are biased by biasing forces such that one of them gets actuated at a lower current value and the other actuator plunger gets actuated at a higher current value.

The single magnetic path through the two actuator plungers is achieved by a pair of magnetic paths, having an upper magnetic path and a lower magnetic path, configured on upper side and lower side respectively of the two actuator plungers such that the single magnetic path runs through the first actuator plunger, the upper magnetic path, the second actuator plunger and the lower magnetic path.

In another embodiment, the device is configured such that passing a current through the single coil creates two magnetic paths such that one of the actuator plungers is in only one of the two magnetic paths, and the other actuator plunger is both the magnetic paths. The actuator plunger which is part of both the magnetic paths, is subjected to higher magnetic force and therefore gets actuated at lower current, and the other actuator plunger, which is part of only one of the two magnetic paths, is subjected to lower magnetic force and therefore gets actuated at higher current.

The two magnetic paths are achieved by providing a connecting portion between the upper magnetic path and the low magnetic path, which is located between the second actuator plunger and the solenoid winding. The connecting portion provides a secondary magnetic path through the first actuator plunger, a part of the upper magnetic path, the connecting portion and a part of the lower magnetic path.

Referring now to FIG. 1, the disclosed single solenoid double actuator device 100 includes a solenoid winding 102 wound around a tubular shaped bobbin 104 having an opening. The opening defines an axis A-A of the solenoid winding 102. A first actuator plunger 106 (Also referred to as first actuator or as first plunger, and all these terms used interchangeably hereinafter) may be configured through the opening of the solenoid winding 102 for linear movement along the axis A-A between an actuated position and a dropped position. The actuated position of the first actuator plunger 106 may correspond to a position in which one end, such as an upper end, of the first actuator 106 makes a contact with a static pole, such as static pole 108 located coaxially above the first actuator 106, and the dropped position may correspond to a position in which the upper end of the first actuator 106 is not in contact with the static pole 108, i.e. a gap, such as gap 110 shown in FIG. 1, exists between the upper end of the first actuator 106 and the static pole 108.

The first actuator 106 during its linear motion between the dropped portion and the actuated position may be guided within a first guide 112 located within the bobbin 104 aligned along the axis A-A. Further, the first actuator 106 may be biased to remain in the dropped position by a biasing force, referred to as first biasing force.

The biasing force may be provided by a first spring located between a collar, such as collar 114 of the first actuator 106 and the first guide 112 such that a biasing force, referred to as first biasing force, is applied to the first actuator 106 to keep it in the dropped position, i.e. away from the static pole 108.

The device 100 includes a second actuator plunger 120 (Also referred to as second actuator or as second plunger, and all these terms used interchangeably hereinafter), which may be arranged through an annular shaped second actuator guide 122 for linear movement along an axis B-B, referred to as second actuator axis. The second actuator plunger 120 may be arranged such that the second actuator axis B-B and is spaced from the axis A-A of the solenoid winding 102, and may be substantially parallel.

It is to be appreciated that while the exemplary illustrations show that axis A-A and axis B-B are parallel, it is possible to configure the device such that the two actuators plungers 106 and 120 are in configuration other than parallel, such as an angular configuration wherein the axis B-B is at angel to the axis A-A, and all such variations are well within the scope of the present disclosure without any limitations whatsoever.

The device may further include a pair of magnetic paths having an upper magnetic path 130 located at an upper end of the solenoid winding 102 and the second guide 122, and a lower magnetic path 132 located at a lower end of the solenoid winding 102 and the second guide 122. Thus, the first actuator 106 and the second actuator 120 may be arranged between the upper magnetic path 130 and the lower magnetic path 132 such that when a current is passed through the solenoid winding 102, a magnetic field is setup along a magnetic path through the first actuator 106, the upper magnetic path 130, the second actuator 120 and the lower magnetic path 132.

The upper magnetic path 130 and the lower magnetic path 132 can be any of a plate, profiles like rod, pipe, tubes etc. made of a ferro-magnetic material.

The second actuator 120 may linearly move between an actuated position and a dropped position, and may be biased by a second biasing force to remain in the dropped position. The actuated position of the second actuator plunger 120 may correspond to a position in which one end, such as an upper end, of the second actuator 120 makes a contact with the upper magnetic path 130, and the dropped position may correspond to a position in which the upper end of the second actuator 120 is not in contact with the upper magnetic path 130, i.e. a gap, such as gap 126 shown in FIG. 1, exists between the upper end of the second actuator 120 and the upper magnetic path 130.

The second actuator 120 may be biased to remain in the dropped position by a second spring 124 configured between the second actuator 120 and the upper magnetic path 130 such that the second spring 124 exerts a biasing force, referred to as second biasing force, on the second actuator 120 in the direction towards the lower magnetic path 132.

The first biasing force exerted by the first spring 116 on the first actuator 106, the second biasing force exerted by the second spring 124 on the second actuator 120 may differ and depending on other factors, such as the magnetic path, or configuration of the actuator plungers 106 and 120, the actuator subjected to a lower biasing force or subjected to higher magnetic force, may get actuated first to move to the actuated position when a gradually increasing current is applied to the solenoid winding 102. The other actuator that is subjected to a higher biasing force, or lower magnetic force, may get actuated at a higher current through the solenoid winding 102.

In an example application, the first actuator 106 may get actuated first at a first current value overcoming the first biasing force which may be lower than the second biasing force, and the second actuator 120 may get actuated subsequently at a higher second current value overcoming the second biasing force which may be higher than the first biasing force.

In an example application, the first actuator 106 may get actuated at a current of 1 Amp, and the second actuator 120 may get actuated at a current of 3.27 Amps. The solenoid winding may have a resistance of 2.5502 and the required current values for actuation of the first actuator 106 and the second actuator 120 may be achieved by application of voltage of 2.7 V and 9.3V respectively.

As is known in the art, force of a plunger of as a result of a current passing through the coil depends on stroke L (distance plunger of the actuator needs to move), permeability of the actuator plunger (μ) which depends on material of the plunger, area exposed (A) to the magnetic field, current (I) passing through the solenoid coil and number of turns (N) in the solenoid coil, General formula which is used for this is as below:

$$F = \frac{\mu^2 N^2 I^2 A}{2\mu_0 L^2}$$

where $\mu_0$ is permeability of air.

Therefore, the actuators may be configured, by selecting materials having different permeability for the plungers of the two actuator, and different geometry, to experience different forces for same current applied to the solenoid, thereby controlling which of the two actuators gets actuated first at lower current, followed by other actuator with increase of current. Besides these parameters, stroke of the respective plungers and biasing force on the plungers, which is controlled by the respective biasing springs, shall play important role.

In an alternate embodiment, the actuation of one of the two actuator plungers at a lower current and actuation of the other actuator plunger at a higher current may be achieved by providing two magnetic paths. One of the two actuator plungers may be part of both the magnetic paths but the other actuator plunger is part of only one of the two magnetic paths. The actuator plunger which is part of two magnetic paths is subjected to higher magnetic force, and therefore, may get actuated at lower current applied through the solenoid winding. The other actuator plunger being part of only one of the two magnetic paths, is subjected to lower magnetic force, and therefore, shall get actuated at higher current through the solenoid winding.

Figure 3:
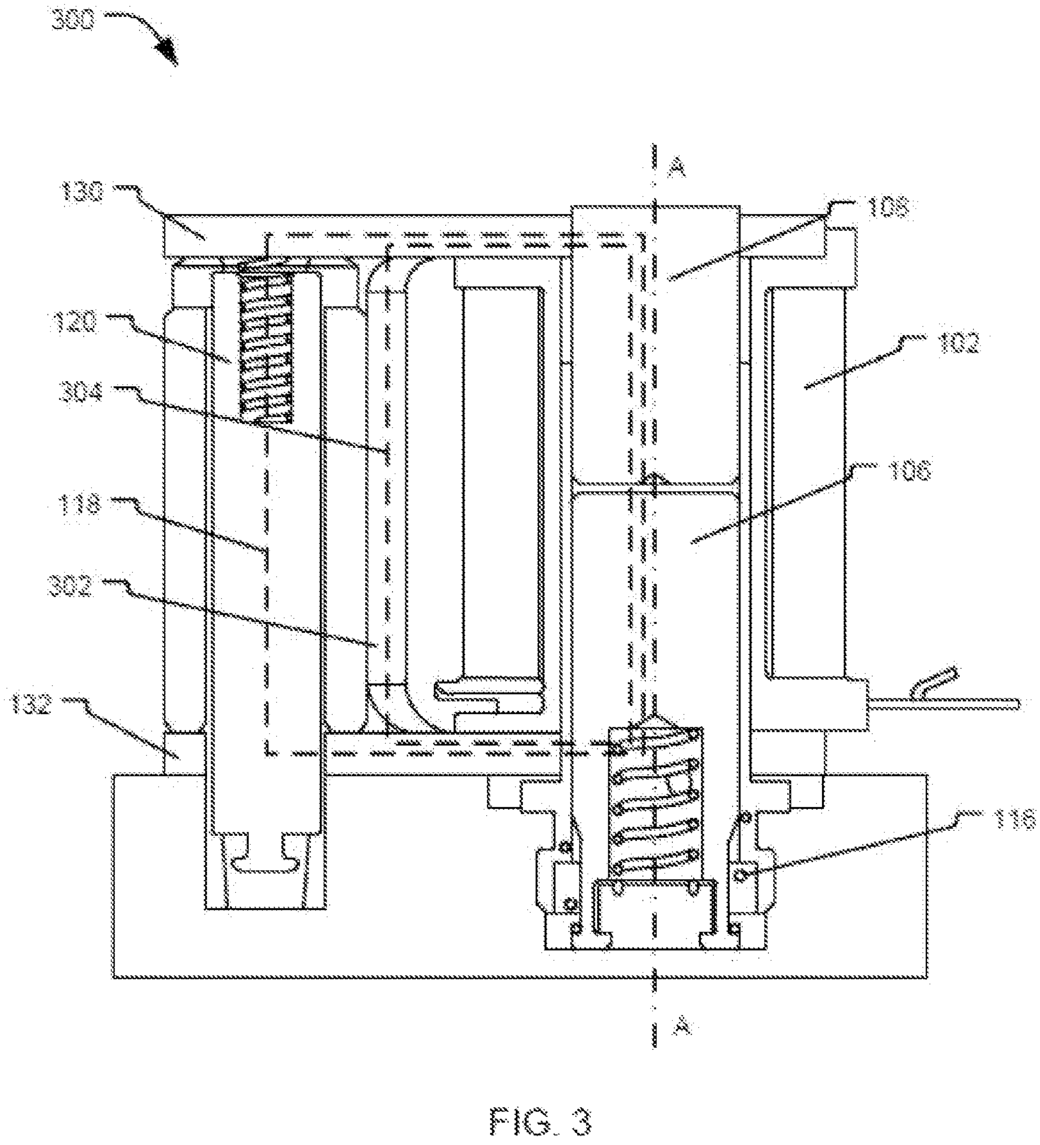
FIG. 3 illustrates an exemplary representation of the single solenoid based double actuator device having two magnetic paths, in accordance with embodiments of the present disclosure.

FIG. 3 illustrates an exemplary representation of the single solenoid based double actuator device 300 having two magnetic paths, wherein the upper magnetic path 130 and the lower magnetic path 132 are coupled to each other by a connecting portion 302 located between the second actuator plunger 120 and the solenoid winding 102. The connecting portion 302 may provide a secondary magnetic path 304 through the first actuator plunger 106, a part of the upper magnetic path 130, the connecting portion 302 and a part of the lower magnetic path 132. As before, earlier magnetic path, referred to as primary magnetic path, through the first actuator 106, the upper magnetic path 130, the second actuator 120 and the lower magnetic path 132 also exists, and passes through both the actuator plungers 106 and 120, as against the secondary magnetic path that passes through only the first actuator plunger 106.

Therefore, the first actuator plunger 106 is part of both the magnetic paths, i.e. the primary magnetic path 118 and the secondary magnetic path 304, but the second actuator plunger 120 is part of only the primary magnetic paths 118. The first actuator plunger 106 being part of the two magnetic paths 118 and 304 is subjected to higher magnetic force, and therefore may get actuated at lower current through the solenoid winding 102, and the second actuator plunger 120 being part of only the primary magnetic path 118, is subjected to lower magnetic force and shall get actuated at higher current through the solenoid winding 102.

When the current through the solenoid winding 102 exceeds the first current value, only the first actuator plunger 106 may move to the corresponding actuated position overcoming the corresponding biasing force on account of higher magnetic force from combination of magnetic fields through the primary magnetic path 118 and the secondary magnetic path 304, with the second actuator plunger 120 remaining unmoved in the dropped position due to weaker magnetic force from the magnetic field through the lone secondary magnetic path 304.

When the current through the solenoid winding 102 exceeds the second current value, the second actuator plunger 120 may also move to the corresponding actuated position overcoming the corresponding biasing force on account of magnetic force from comparatively weaker magnetic field through the secondary magnetic path 304.

Figure 4:
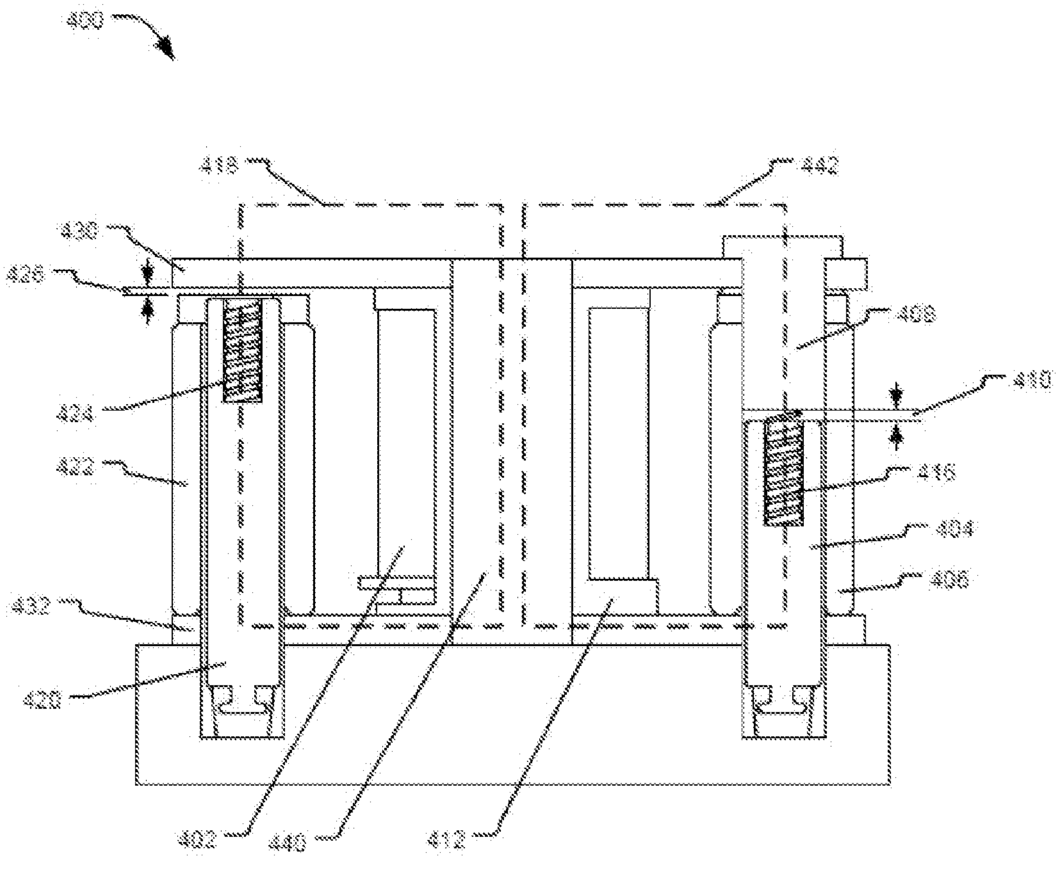
FIG. 4 illustrates an exemplary representation of the proposed single solenoid based double actuator device having axis of the solenoid separated from axis of first actuator and the second actuator, in accordance with embodiments of the present disclosure.

In another embodiment, a single solenoid based double actuator device is disclosed, wherein the axis of the solenoid is separated from axis of first actuator and the second actuator. Referring to FIG. 4, the disclosed single solenoid based double actuator device 400 having the axis of the solenoid separated from axis of first actuator and the second actuator includes a solenoid winding 402 wound around a bobbin 412 having an opening along an axis of the solenoid winding and a connecting static pole 440 located along the axis of the solenoid winding 402 through the opening. A pair of magnetic paths is provided having an upper magnetic path 430 located at an upper end of the connecting static pole 440, and a lower magnetic path 432 located at a lower end of the connecting static pole 440.

A first actuator plunger 404 is arranged through a first guide 406 along with a static pole 408 for linear movement between an actuated position and a dropped position along a first actuator axis. A second actuator plunger 420 is arranged through a second guide 422 for linear movement between an actuated position and an dropped position along a second actuator axis. The first actuator plunger 404 is biased by a first spring 416 that provides a first biasing force, to remain in the dropped position, and the second actuator plunger 430 is biased by a second spring 424 that provides a second biasing force to keep the second actuator 420 in corresponding dropped position.

The first actuator plunger 404 and the second actuator plunger 420 may be arranged between the upper magnetic path 430 and the lower magnetic path 432 such that the first actuator axis and the second actuator axis are spaced apart from the axis of the solenoid winding 402.

In an aspect, the connecting static pole 440, the upper magnetic path 430, the static pole 408, the first actuator plunger 404, and the lower magnetic path 432 provide a first magnetic path 442 for a magnetic field created as a result of passing of a current through the solenoid winding 402, and the connecting static pole 440, the upper magnetic path 430, the second actuator plunger 420, and the lower magnetic path 432 provide a second magnetic path 418 for the magnetic field created as a result of passing of a current through the solenoid winding.

FIG. 4 shows an unactuated position of the device 400 when no current is supplied to the solenoid winding 402, and both the first actuator plunger 404 and the second actuator plunger 420 are in their corresponding dropped positions. The dropped positions of the first actuator plunger 404 and the second actuator plunger 420 are shown by a first gap 410 between the first actuator plunger 404 and the static pole 408, and a second gap 426 between the second actuator plunger 420 and the upper magnetic path 320.

Figure 5A:
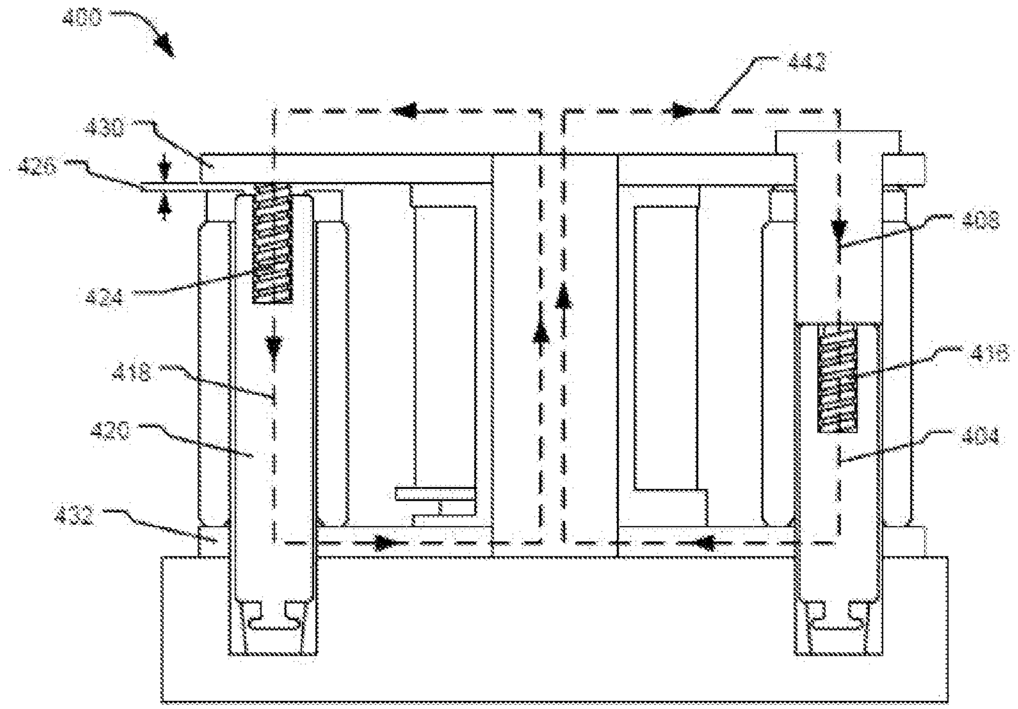
FIG. 5A illustrates an exemplary representation of the single solenoid based double actuator device of FIG. 4 showing a first actuator plunger in actuated position, in accordance with embodiments of the present disclosure.
Figure 5B:
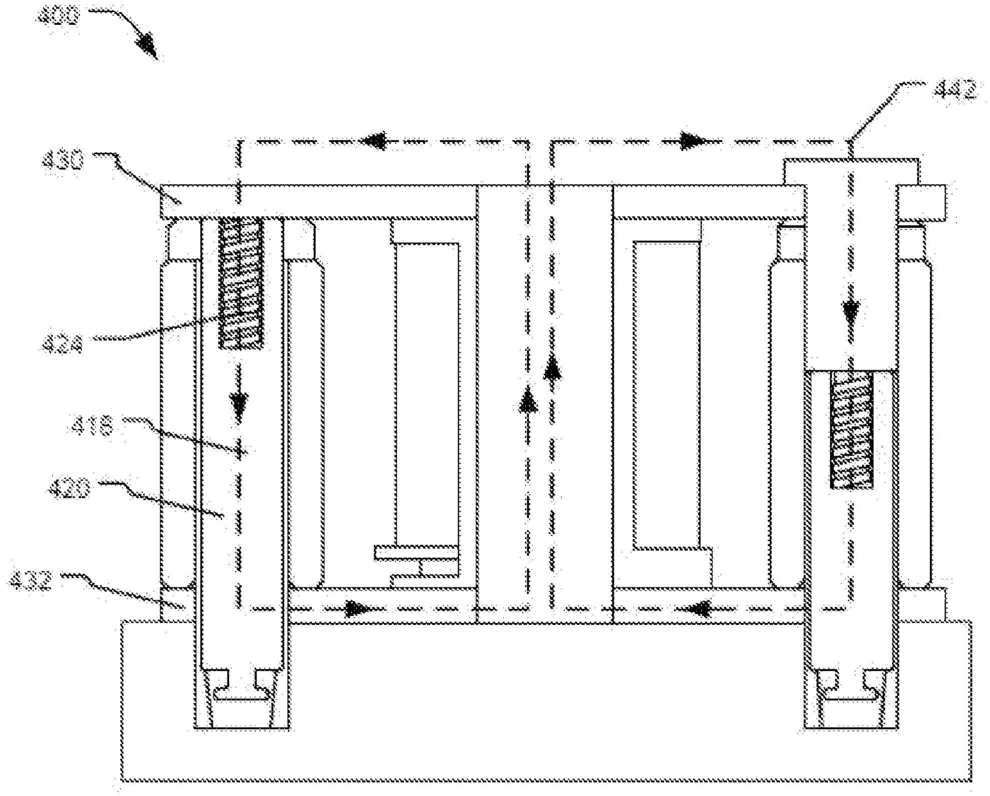
FIG. 5B illustrates an exemplary representation of the single solenoid based double actuator device of FIG. 4 showing both the actuator plungers in actuated position, in accordance with embodiments of the present disclosure.

In an aspect, the first biasing force, the second biasing force, the first magnetic path 442 and the second magnetic path 418 are configured such that when the current through the solenoid winding 402 exceeds a first current value, one of the first actuator plunger and the second actuator plunger is moved to the corresponding actuated position overcoming the corresponding biasing force to close the first gap 410 as shown in FIG. 5A, where the first actuator plunger 404 is shown in the actuated position indicated by absence of the first gap 408, whereas the second actuator plunger 420 is still in dropped position indicated by the second gap 426. When the current through the solenoid winding 402 exceeds a second current value, which is higher than the first current value, other of the second actuator plunger 420 is also moved to the corresponding actuated position overcoming the corresponding biasing force. This position is shown in FIG. 5B, where both the first actuator plunger 404 and the second actuator plunger 420 are shown in the actuated position indicated by absence of the first gap 408 and the second gap 426.

In an embodiment, in any of the configurations of the single solenoid based double actuator device 100, 300 and 400 depicted in FIGS. 1, 3 and 4 respectively, the biasing force on one of the two or both the actuator plungers 106 and 120 may be applied by a combination of a permanent magnet, such as a first permanent magnet and the second permanent magnet, and a spring, such as a first spring and the second spring, respectively configured with the corresponding actuators. The permanent magnets may below intensity permanent magnets, and the magnet and the corresponding spring may be configured such that a net biasing force, either from the spring or the permanent magnet, works on the corresponding actuator plunger to keep it in the dropped position. When a current is applied to the solenoid 102, the generated magnetic field may, depending on configuration, supplement or counter the magnetic field from the permanent magnet to move the actuator plunger to the actuated position.

As can be appreciated that there are many ways to configure the permanent magnet and the spring on one or both of the actuators to achieve actuation of one of the two actuators at lower current and the other actuator at a higher current. For example, the first permanent magnet and the second permanent magnet may be configured such that the respective magnetic fields are in opposite directions, in which case the magnetic field generated as a result of passing of a current through the solenoid winding shall add to the magnetic field of the one of the two permanent magnets and shall nullify the magnetic field of the other of the two permanent magnets. When a current exceeding the first current value is applied through the solenoid winding in a first direction one of the first actuator plunger and the second actuator plunger shall move to the corresponding actuated position. On the other hand, when a current exceeding the second current value is applied through the solenoid winding in a second direction that is opposite the first direction, other of the first actuator plunger and the second actuator plunger shall be moved to the corresponding actuated position. When the current in the second direction is further increase, both the actuator plungers are moved to the actuated positions.

Thus, using above configuration, it is possible to achieve three independent combinations for positions of the two actuator plungers. The three combinations being a first combination in which only the first actuator is moved to the actuated position, which ison application of a current in the first direction; s second combination in which only the second actuator plunger is moved to the actuated position, which is on application of a low current in the second direction; and the third combination in which both the first and the second actuator plungers are moved to the actuated position, which is on application of a higher current in the second direction. These three combinations are besides a combination in which both the actuation plungers are in dropped condition.

Advantage of the proposed concept, implemented in different manners as described by different embodiments as above, is lower cost as need for two separate solenoids, primary and secondary, is eliminated. Also plungers 106 and 120 of the two actuators may be arranged in non-coaxial configuration, i.e. they need not have linear movement along a common axis, and can be arranged in parallel configuration or at an angle.

In yet another embodiment applicable to any of the configurations of the single solenoid based double actuator device 100, 300 and 400 depicted in FIGS. 1, 3 and 4 respectively, the actuator plungers may be configured for latching in the actuated position so that the applied current may be switched off after the actuators have been actuated by pulsed current, thereby reducing power consumption. In this scenario, the permanent magnets may be selected such that they have enough magnetic force such that it holds the corresponding plunger once lifted against spring load to maintain the latching.

In an exemplary implementation, a first magnet (not shown) is used with the first plunger 106 in combination of a first spring such that a net force from the first spring, referred to as first biasing force, biases the first plunger 106 in the dropped position. A second magnet (not shown) is used with the second plunger 120 in combination with a second spring such that a net force, referred to as second biasing force, from the second spring biases the second plunger 120 in the dropped position. The first magnet may have a lower strength compare to the second magnet but enough to hold the first plunger 106 once lifted, and the second magnet is able to hold the second plunger 120 once lifted, against their respective spring loads.

Direction of the first magnet and the second magnet may be kept opposite, such that when a supply pulse (referred to as first pulse) of a first current value is given to the solenoid winding 102 in a first direction, the first plunger 106 moves to the actuated position on account of the generated electro-magnetic field supporting the magnetic field from the first magnet to overcome the net biasing force on the first plunger 106, and is held in the actuated position by the latching action even after the current stops. The second plunger 120 does not get actuated on application of current in the first direction because direction of the generated electro-magnetic field is opposite to magnetic field of the second magnet, thereby adding to the biasing force to keep the second plunger 120 in the dropped position.

When a pulse of the second current value (referred to as second pulse), which is lower than the first current value but in a second direction, which is opposite the first direction, is supplied to the solenoid winding 102, an electro-magnetic field in opposite direction matching the direction of magnetic field of the second magnet is generated, and gets added to the magnetic field of the second magnet. The enhanced magnetic field may provide adequate magnetic force to the second plunger 120 to overcome the second biasing force. The second current value being lower than the first current value or the current required to unlatch the first plunger, the first plunger remains in the actuated position. When the second pulse stops, the second plunger remains in the actuated position because of the latching action. Thus, both the first plunger and the second plunger attain corresponding actuated positions.

In order to move the actuator plungers 106 and 120 back to the dropped positions, a pulse of high current in the second direction may be given so that the first plunger 106 gets release from the latched actuated position by nullifying the magnetic field of the first magnet, thereby enhancing the force from the first spring and moving the first plunger 106 to the dropped position. Likewise, the second plunger 120 can be unlatched and moved to the dropped position by giving low current pulse in the first direction. The requirement of the pulsed currents, their direction and position of the plungers is summarized in the below table:

| Current pulse | | Plunger movement | |
|---|---|---|---|
| Direction | Strength | First plunger | Second plunger |
| First direction | High | Moves to actuated position | Remains in dropped position |
| Second direction | Low | Remains in actuated position | Moves to actuated position |

-continued

| Current pulse | | Plunger movement | |
|---|---|---|---|
| Direction | Strength | First plunger | Second plunger |
| Second direction | High | Moves to dropped position | Remains in actuated position |
| First direction | low | Remains in dropped position | Moves to dropped position |

In the proposed embodiment, the Double actuator device requires only pulses of current and not continuous current to change the status of the two actuators, which reduces power consumption. Besides in situations of power failure the system does not reset and maintains the last position.

Thus, the present disclosure provides a single solenoid double actuator device, which actuates two actuator plungers at two different current values. The disclosed device overcomes drawback of known single solenoid double actuator devices that require the two actuator plungers to be arranged in collinear fashion. An embodiment of the disclosed device allows the device to be actuated by current pulses, thereby reducing power consumption and eliminating need to reset the device in instances of power failure. Further, the disclosed concept can be used to configure devices having more than two actuators.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a single solenoid double actuator device that overcomes drawback of known devices.

The present disclosure provides a single solenoid double actuator device that does not require the two actuators to be in collinear arrangement.

The present disclosure provides a single solenoid double actuator device that allows actuation of the two actuators in sequential manner or independently.

The present disclosure provides a single solenoid double actuator device that uses a single magnetic path to actuate the two actuators.

The present disclosure provides a single solenoid double actuator device that consumes less power by enabling actuation of the two actuators by current pulses.

I claim:

1. A single solenoid based double actuator device, the device comprising;

a solenoid winding having an opening along an axis of the solenoid winding;

a first actuator plunger configured through the opening of the solenoid winding for linear movement along the axis of the solenoid winding between an actuated position and a dropped position and being biased by a first biasing force to remain in the dropped position;

a pair of magnetic paths comprising an upper magnetic path configured at an upper end of the solenoid winding, and a lower magnetic path configured at a lower end of the solenoid winding;

a second actuator plunger configured for linear movement along a second actuator axis between an actuated position and an dropped position and biased by a second biasing force to remain in the dropped position;

wherein the first actuator plunger, the upper magnetic path, the second actuator plunger and the lower magnetic path provide a magnetic path for a magnetic field created as a result of passing of a current through the solenoid winding; and wherein the first biasing force, the second biasing force and the magnetic path is configured such that when the current through the solenoid winding exceeds a first current value, one of the first actuator plunger and the second actuator plunger is moved to the corresponding actuated position overcoming the corresponding biasing force, and when the current through the solenoid winding exceeds a second current value, which is higher than the first current value, other of the first actuator plunger and the second actuator plunger is also moved to the corresponding actuated position overcoming the corresponding biasing force.

2. The device as claimed in claim 1, wherein the first biasing force is higher than the second biasing force, and when the current through the solenoid winding exceeds the first current value, the first actuator plunger is moved to the corresponding actuated position overcoming the first biasing force, and when the current through the solenoid winding exceeds the second current value, the second actuator plunger is moved to the corresponding actuated position overcoming the second biasing force.

3. The device as claimed in claim 1, wherein the first biasing force is provided by a first spring configured between a collar on the first actuator plunger and the first guide to bias the first actuator plunger in a direction towards the lower magnetic path.

4. The device as claimed in claim 3, wherein the second biasing force is provided by a second spring configured between the second actuator plunger and the upper magnetic path to bias the second actuator plunger in the direction towards the lower magnetic path.

5. A single solenoid based double actuator device, the device comprising;

a solenoid winding having an opening along an axis of the solenoid winding;

a first actuator plunger configured through the opening for linear movement along the axis of the solenoid winding between an actuated position and an dropped position and being biased by a first biasing force to remain in the dropped position;

a pair of magnetic paths comprising an upper magnetic path configured at an upper end of the solenoid winding, and a lower magnetic path configured at a lower end of the solenoid winding;

a second actuator plunger arranged configured for linear movement along a second actuator axis between an actuated position and an dropped position and being biased by a second biasing force to remain in the dropped position;

wherein the first actuator plunger, the upper magnetic path, the second actuator plunger and the lower magnetic path provide a primary magnetic path for a magnetic field created as a result of passing of a current through the solenoid winding; and wherein the upper magnetic path and the lower magnetic path are coupled to each other by a connecting portion located between the second actuator plunger and the solenoid winding, the connecting portion providing a secondary magnetic path through the first actuator plunger, a part of the upper magnetic path, the connecting portion and a part of the lower magnetic path; and wherein the first biasing force, the second biasing force and the primary magnetic path and the secondary magnetic path are configured such that when the current through the solenoid winding exceeds a first current value, the first actuator plunger is moved to the corresponding actuated position overcoming the corresponding biasing force, and when the current through the solenoid winding exceeds a second current value, which is higher than the first current value, the second actuator plunger is also moved to the corresponding actuated position overcoming the corresponding biasing force.

6. The device as claimed in claim 5, wherein when the current through the solenoid winding exceeds the first current value, only the first actuator plunger is moved to the corresponding actuated position overcoming the corresponding biasing force on account of higher magnetic force from combination of magnetic fields through the magnetic path formed by the first actuator plunger, the upper magnetic path, the second actuator and the lower magnetic path, and the secondary magnetic path formed by the first actuator plunger, a part of the upper magnetic path, the connecting portion and a part of the lower magnetic path.

7. The device as claimed in claim 6, wherein when the current through the solenoid winding exceeds the second current value, the second actuator plunger is also moved to the corresponding actuated position overcoming the corresponding biasing force on account of magnetic force from comparatively weaker magnetic field through the secondary magnetic path formed by the first actuator plunger, a part of the upper magnetic path, the connecting portion and a part of the lower magnetic path.

8. The device as claimed in claim 6, wherein the solenoid axis is located between the first actuator axis and the second actuator axis.

9. A single solenoid based double actuator device, the device comprising;

- a solenoid winding having an opening along an axis of the solenoid winding;
- a connecting static pole provided through the opening of the solenoid winding;
- a pair of magnetic paths comprising an upper magnetic path configured at an upper end of the solenoid winding and coupled to an upper end of the connecting static pole, and a lower magnetic path configured at a lower end of the solenoid winding and coupled to a lower end of the connecting static pole;
- a first actuator plunger configured between the upper magnetic path and the lower magnetic path for linear movement along an first actuator axis between an actuated position and an dropped position and being biased by a first biasing force to remain in the dropped position; and
- a second actuator plunger configured between the upper magnetic path and the lower magnetic path for linear movement along a second actuator axis between an actuated position and an dropped position and being biased by a second biasing force to remain in the dropped position;

wherein the first actuator axis and the second actuator axis are spaced apart from the solenoid axis;

wherein the first actuator plunger, the static pole, the upper magnetic path, the connecting static pole, and the lower magnetic path provide a first magnetic path for a magnetic field created as a result of passing of a current through the solenoid winding;

and the second actuator plunger, the upper magnetic path, the connecting static pole, and the lower magnetic path provide a second magnetic path for the magnetic field created as a result of passing of a current through the solenoid winding; and wherein the first biasing force, the second biasing force, the first magnetic path and the second magnetic path are configured such that when the current through the solenoid winding exceeds a first current value, one of the first actuator plunger and the second actuator plunger is moved to the corresponding actuated position overcoming the corresponding biasing force, and when the current through the solenoid winding exceeds a second current value, other of the first actuator plunger and the second actuator plunger is also moved to the corresponding actuated position overcoming the corresponding biasing force.

10. The device as claimed in claim 9, wherein the first biasing force is provided by a first spring configured with the first plunger, and the second biasing force is provided by a second spring configured with the second plunger, and wherein the second current value is higher than the first current value and in the same direction.

11. The device as claimed in claim 9, wherein the first biasing force is provided by a combination of a first permanent magnet and a first spring configured with the first actuator plunger, and the second biasing force is provided by a combination of a second permanent magnet and a second spring configured with the second actuator plunger.

12. The device as claimed in claim 11, wherein the magnetic field generated as a result of passing of a current through the solenoid winding, either supports or nullifies magnetic fields of the first permanent magnet and the second permanent magnet to change the net biasing force on the corresponding actuator plunger such that when the current through the solenoid winding exceeds a first current value, one of the first actuator plunger and the second actuator plunger is moved to the corresponding actuated position, and when the current through the solenoid winding exceeds a second current value, which is higher than the first current value and in same direction as the first current value, other of the first actuator plunger and the second actuator plunger is also moved to the corresponding actuated position.

13. The device as claimed in claim 11, wherein the first permanent magnet and the second permanent magnet are configured such that the respective magnetic fields are in opposite directions, and the magnetic field generated as a result of passing of a current through the solenoid winding adds to the magnetic field of the one of the two permanent magnets and nullifies the magnetic field of the other of the two permanent magnets; and wherein when a current exceeding the first current value is applied through the solenoid winding in a first direction, one of the first actuator plunger and the second actuator plunger is moved to the corresponding actuated position, and when a current exceeding the second current value is applied through the solenoid winding in a second direction that is opposite the first direction, the other of the first actuator plunger and the second actuator plunger is moved to the corresponding actuated position; and wherein when the current in the second direction is increased, both the first actuator plunger and the second actuator plunger are moved to the corresponding actuated positions.

14. A single solenoid based double actuator device, the device comprising;

a solenoid winding having an opening along an axis of the solenoid winding;

a first actuator plunger configured through the opening for linear movement along the axis of the solenoid winding between an actuated position and an dropped position and being biased by a first biasing force to remain in the dropped position;

a pair of magnetic paths comprising an upper magnetic path configured at an upper end of the solenoid winding, and a lower magnetic path configured at a lower end of the solenoid winding;

a second actuator plunger configured for linear movement along a second actuator axis between an actuated position and an dropped position and being biased by a second biasing force to remain in the dropped position;

wherein the first actuator plunger, the upper magnetic path, the second actuator plunger and the lower magnetic path provide a magnetic path for a magnetic field generated as a result of passing of a current through the solenoid winding; and wherein the first biasing force is provided by a combination of a first permanent magnet and a first spring configured with the first actuator plunger, and the second biasing force is provided by a combination of a second permanent magnet and a second spring configured with the second actuator plunger;

wherein the magnetic field generated as a result of passing of a current through the solenoid winding, either supports or nullifies magnetic fields of the first permanent magnet and the second permanent magnet to change the net biasing force on the corresponding actuator plunger such that when the current through the solenoid winding exceeds a first current value, one of the first actuator plunger and the second actuator plunger is moved to the corresponding actuated position, and when the current through the solenoid winding exceeds a second current value, which is higher than the first current value other of the first actuator plunger and the second actuator plunger is also moved to the corresponding actuated position.

15. The device as claimed in claim 14, wherein the first permanent magnet and the second permanent magnet are configured such that the respective magnetic fields are in opposite directions, and the magnetic field generated as a result of passing of a current through the solenoid winding adds to the magnetic field of the one of the two permanent magnets and nullifies the magnetic field of the other of the two permanent magnets; and wherein when a current exceeding the first current value is applied through the solenoid winding in a first direction, one of the first actuator plunger and the second actuator plunger is moved to the corresponding actuated position, and when a current exceeding the second current value is applied through the solenoid winding in a second direction that is opposite the first direction, the other of the first actuator plunger and the second actuator plunger is moved to the corresponding actuated position; and wherein when the current in the second direction is increased, both the first actuator plunger and the second actuator plunger are moved to the corresponding actuated positions.

16. A single solenoid based double actuator device, the device comprising;

a solenoid winding having an opening along an axis of the solenoid winding;

a first actuator plunger configured through the opening for linear movement along the axis of the solenoid winding between an actuated position and an dropped position and being biased by a first biasing force to remain in the dropped position;

a pair of magnetic paths comprising an upper magnetic path configured at an upper end of the solenoid winding, and a lower magnetic path configured at a lower end of the solenoid winding;

a second actuator plunger configured for linear movement along a second actuator axis between an actuated position and an dropped position and being biased by a second biasing force to remain in the dropped position;

wherein the first actuator plunger, the upper magnetic path, the second actuator plunger and the lower magnetic path provide a magnetic path for a magnetic field generated as a result of passing of a current through the solenoid winding; and wherein the first biasing force is provided by a combination of a first permanent magnet and a first spring configured with the first actuator plunger, and the second biasing force is provided by a combination of a second permanent magnet and a second spring configured with the second actuator plunger; the two permanent magnets and the corresponding springs being configured such that magnetic force on the first actuator plunger and the second actuator plunger from the respective permanent magnets partly nullifies the force from the corresponding springs;

wherein the magnetic field generated as a result of passing of a current through the solenoid winding, either supports or nullifies magnetic fields of the first permanent magnet and the second permanent magnet to change the net biasing force on the corresponding actuator plunger such that when the current through the solenoid winding exceeds a first current value, one of the first actuator plunger and the second actuator plunger is moved to the corresponding actuated position, and when the current through the solenoid winding exceeds a second current value, other of the first actuator plunger and the second actuator plunger is also moved to the corresponding actuated position; and wherein each of the first actuator plunger and the second actuator plunger and the corresponding permanent magnets are configured for latching of the first actuator plunger and the second actuator plunger in the corresponding actuated positions such that after the current through the solenoid winding is stopped, the first actuator plunger and the second actuator plunger remain in the actuated position thereby enabling actuation of the device by applying current pulses.

17. The device as claimed in claim 16, wherein the first permanent magnet and the second permanent magnet are configured such that the respective magnetic fields are in opposite directions, and the magnetic field generated as a result of passing of a current through the solenoid winding adds to the magnetic field of the one of the two permanent magnets and nullifies the magnetic field of the other of the two permanent magnets;

and wherein one of the first actuator plunger and the second actuator plunger is moved to the corresponding actuated position, and when the current pulse exceeding the first current value is applied through the solenoid winding in a first direction, and the other of the first actuator plunger and the second actuator plunger is also moved to the corresponding actuated position when the current pulse exceeding the second current value is applied through the solenoid winding in a second direction that is opposite the first direction.

18. The device as claimed in claim 16, wherein the second current value is lower than the first current value so that the first actuator plunger does not move to the dropped position.

* * * * *